United States Patent
Kronner et al.

(10) Patent No.: US 6,264,260 B1
(45) Date of Patent: Jul. 24, 2001

(54) PASSIVE RESTRAINT AND INTERLOCK SYSTEM FOR INTERIOR MOUNTED REMOVABLE VEHICULAR COMPONENTS

(75) Inventors: Walter J Kronner, Sterling Heights; James E Van Hout, Auburn Hills, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/625,557

(22) Filed: Jul. 25, 2000

(51) Int. Cl.$^7$ ........................................................ B60N 3/12
(52) U.S. Cl. ............................................................. 296/37.15
(58) Field of Search .............................. 296/37.15, 37.12, 296/37.5, 37.8; 16/82

(56) References Cited

U.S. PATENT DOCUMENTS

| | | | |
|---|---|---|---|
| 1,237,750 | * 8/1917 | Chappell | 296/37.15 |
| 1,243,958 | * 10/1917 | McFarland | 296/37.15 |
| 1,544,018 | * 6/1925 | McDonald | 296/37.15 |
| 1,588,692 | * 6/1926 | Belden | 296/37.15 X |
| 4,239,277 | * 12/1980 | Oda | 296/37.12 |
| 5,275,456 | * 1/1994 | Ishii et al. | 296/37.12 |
| 5,516,177 | * 5/1996 | Levely | 296/37.12 |
| 5,890,751 | * 4/1999 | Seffinga | 16/82 X |
| 5,947,435 | 9/1999 | Small . | |
| 5,957,521 | * 9/1999 | Schlachter | 296/37.15 |

* cited by examiner

*Primary Examiner*—Joseph D. Pape
(74) *Attorney, Agent, or Firm*—Mark P. Calcaterra

(57) ABSTRACT

A storage compartment mounted to the floor of a motor vehicle under a seat. The compartment is for storing vehicle components such as car batteries. The compartment includes an opening secured by a strap and the strap is held in place by a removable fastener and a passive restraint. The passive restraint is meant to secure the strap when the removable fastener is not in place so that the contents of the compartment may not exit the compartment.

14 Claims, 3 Drawing Sheets

PASSIVE RESTRAINT AND INTERLOCK SYSTEM FOR INTERIOR MOUNTED REMOVABLE VEHICULAR COMPONENTS

FIELD OF THE INVENTION

The present invention relates generally to vehicular component storage, and more particularly to storage of motor vehicle components under at least one seat in the passenger compartment.

BACKGROUND

Modern motor vehicles have a multitude of components that must be assembled and stored in the vehicle. A problem that has arisen in many modern vehicles is that to minimize overall body size and to increase vehicle features the space in the engine compartment has become premium. This being the case, there has been a movement to place some components that had been previously mounted in the engine compartment in the passenger compartment. The areas most conducive to such storage within the passenger compartment are the areas below the passenger seats. If components are not mounted here then the area below the seats often goes unutilized or under utilized.

There have been a few designs for under seat compartments, but they have often required the removal of the seats to service the stored components. The removal of the seats has become disadvantageous as more features are added to vehicle seats. Seats with more features generally have more electronics routed through them so that owner removal of the seats is unwanted. Therefore, the old storage compartments that require the removal of the seats to service the stored components are no longer advantageous.

Consequently, storage compartments under the seats must allow access through side doors so that the stored component may be slid out from under the seat. Thus a solid, or unmovable, storage area must contain a door that is secured to contain the vehicle component. Therefore, it is desirable to provide the storage compartment with a passive restraining device that will ensure the component is properly secured in the storage compartment even without a standard securing device.

SUMMARY OF THE INVENTION

According to the invention, a storage compartment is mounted to the vehicle floor under at least one seat in the vehicle. The compartment further comprises an opening that is secured by a strap that is hingedly attached to the remainder of the compartment so that the strap may be moved to allow access to the component stored within the storage compartment. The strap is secured by a removable fastener that is generally installed to secure the opening to the storage compartment. However, a passive restraint is also present to supplement the removable fastener and to secure the strap when the removable fastener is not properly installed or not present. The passive restraint is secured to the vehicle floor and is not removed once installed in the vehicle.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
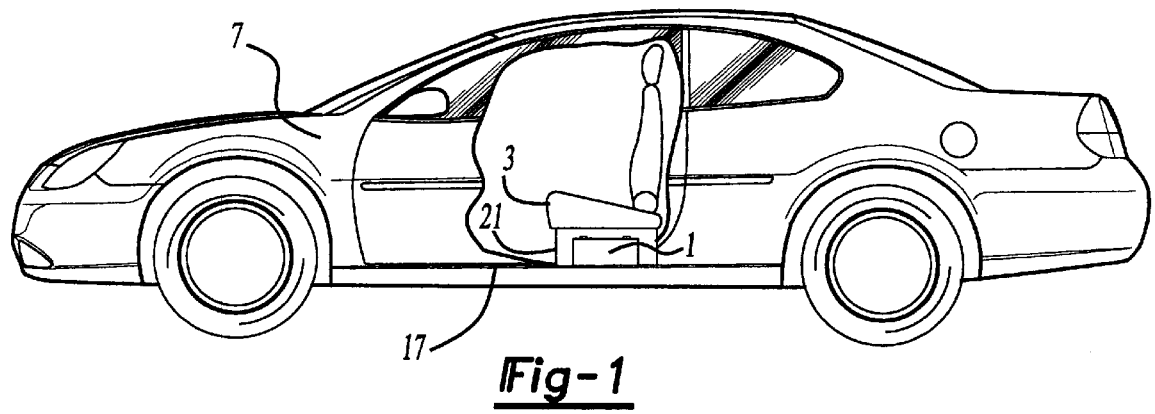
FIG. 1 is a transparent side view of a motor vehicle with a car battery having been placed under a front seat.

FIG. 1 shows the possible placement of a vehicle component, here a battery 1. The battery 1 is placed below a vehicle seat 3 and resting on the vehicle floor 17. The battery 1 may be loaded vertically into place before the seat 3 is installed into the vehicle 7. The battery 1 or other component can be stored within the plurality of supports 21 of the vehicle seat. This space would otherwise be unutilized within the vehicle 7. However, the battery 1 must be secured to ensure retention of the battery 1. Also this system for securing the battery will also allow for ease of service access.

Figure 2:
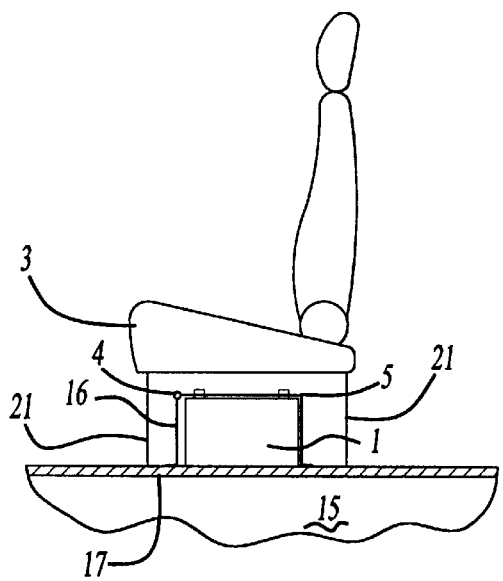
FIG. 2 is a schematic view of a seat bottom having a component storage unit having a car battery placed within it.

FIG. 2 shows a component retention system 15 for securing the battery 1 in place so that it can not move once properly installed. The component retention system 15 includes a main body strap 5, a strap 16 for opening the component retention system 15 and a hinge 4 which hingedly attaches the strap 16 and allows for ease of entry into the component retention system 15.

Figure 3:
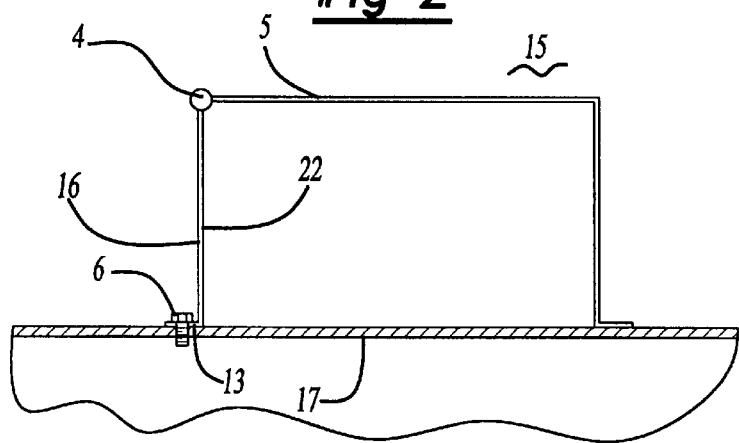
FIG. 3 is a schematic view of the component storage unit.

FIG. 3 shows only the component retention system 15 in which the component may be placed. It can be seen that the strap 16 has a first part 22 which is the main body of the strap 16 and a second part, a flange 13 that extends essentially perpendicular to the main body 22 of the strap 16. A removable fastener 6 fits through an opening in the flange 13 which secures the strap 16 in its closed position. The fastener 6 is secured to the floor 17 of the vehicle.

Figure 4:
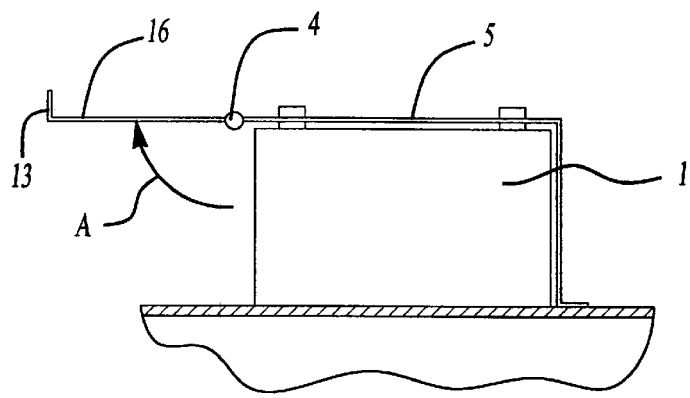
FIG. 4 is a schematic view of the component storage unit in its open position and the direction of the car battery's movement to be serviced.
Figure 5:
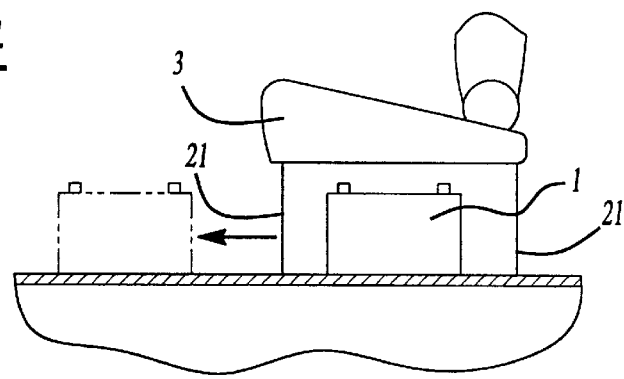
FIG. 5 shows the seat bottom and the installed and uninstalled position of the car battery.

FIG. 4 shows the component retention system 15 with the strap 16 moved in the direction of Arrow A to the opened position. When the strap 16 is in this position the battery 1 may be slid laterally to remove it from the component retention system 15. The strap 16 may be oriented in a fore-aft direction under the seat 3 as long as there is adequate room to remove the battery 1. This allows the battery 1 to be easily serviced after it has been installed under the seat 3. FIG. 5 illustrates how the battery 1 may be moved from its first installed position to a second uninstalled/service position. This entire process is completed without disturbing the seat 3 and any electronics that may be attached to such seat.

Figure 6:
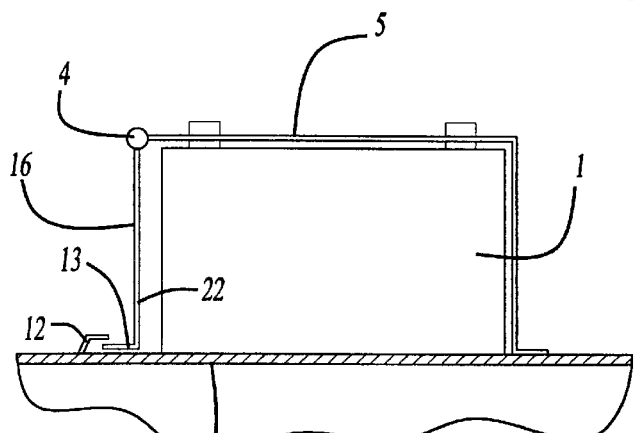
FIG. 6 shows a car battery installed in the component storage unit and the passive restraint.
Figure 7:
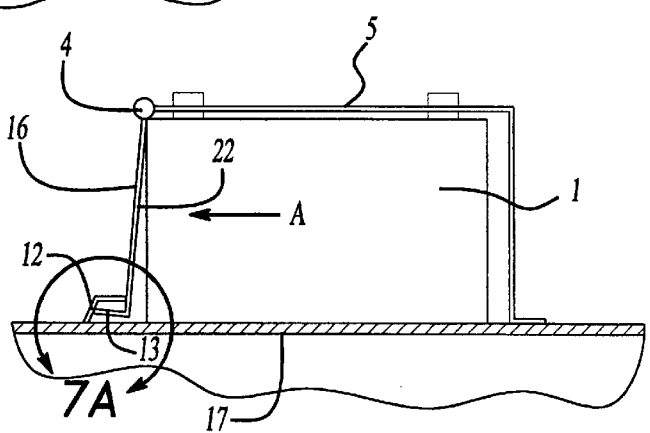
FIG. 7 shows the strap engaging the passive restraint to the component storage unit if the fastener were not present or broken when the battery moves forward.
Figure 7A:
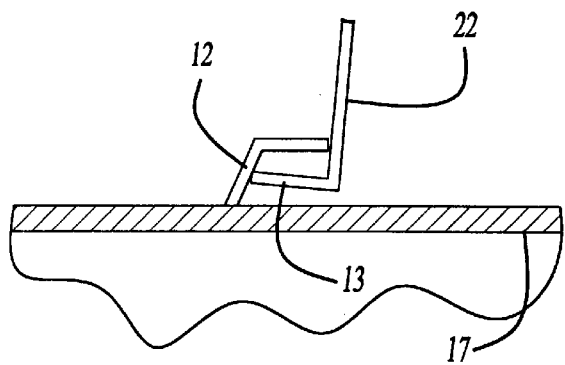
FIG. 7a is an enlarged view of the passive restraint engaging the component storage unit strap.

FIG. 6 shows the passive restraint device in the form of a tab 12 mounted in front of the strap 16. The passive restraint 12 is fixedly attached to the vehicle floor 17 so that it can not be removed even if the captured fastener 6 is lost or not properly replaced. Preferably, the captured fastener 6 is provided with a push nut to prevent the fastener 6 from being removed. The passive restraint 12 is engaged, as shown in FIGS. 7 and 7a when the battery 1 moves towards the strap 16 when the removable fastener 6 has not been properly replaced. FIG. 6 further shows how the passive restraint 12 is truly passive in that when the strap 16 is released the force of gravity pushes the strap away from the passive restraint 12. Therefore, when the battery 1 shifts within the storage compartment 5 the flange 13 on the strap 16 will engage the passive restraint 12.

FIG. 7 shows the flange 13 on the strap 16 engaging the passive restraint 12. FIG. 7A shows an enlargement of this action. The battery 1 is shown moving in the direction 'A' so as to come into contact with the strap 16. In these Figures the removable fastener 6 is not in place so that the passive restraint 12 may be engaged. If the passive restraint 12 were not present then the battery 1 would be able to move out of the component retention system 15 and enter the area of the passenger compartment of the automobile 7. The advantage of this system is that even when the removable fastener 6 is not properly replaced the battery 1 will still remain in the component retention system 15.

Figure 8:
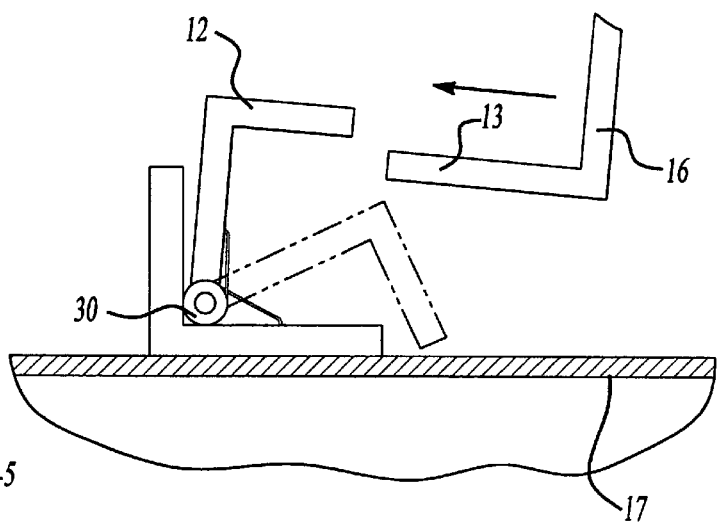
FIG. 8 shows one embodiment of the passive restraint being disengaged from the locked position so as to allow the component storage unit strap to be opened.

FIG. 8 shows a first embodiment for disengaging the passive restraint 12 to service the battery 1 stored in the component retention system 15. In this embodiment the passive restraint 12 is pressed towards the vehicle floor 17, thereby moving the passive restraint 12 from a first generally vertical locked position to a second generally horizontal unlocked position, so that the strap 16 may move over the passive restraint 12. In this manner, the flange 13 may not engage the passive restraint 12. In this embodiment a spring device 30 ensures that the passive restraint 12 will move back to its generally vertical locked position so that the passive restraint 12 may engage the flange 13 once the battery 1 is reinstalled.

Figure 9A:
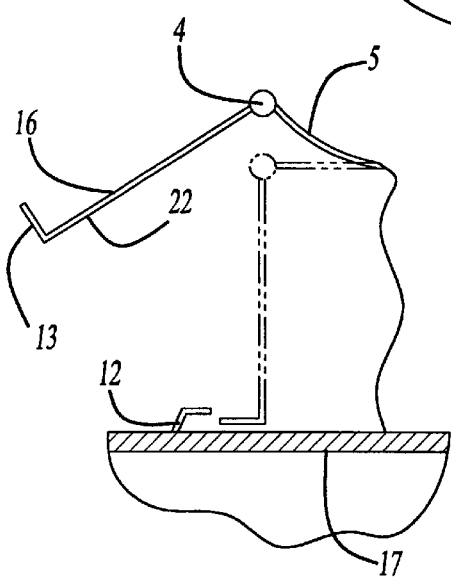
FIG. 9A shows the main body strap being deformed so as to gain access to the storage area without engaging the passive restraint.

FIG. 9A shows a second embodiment for disengaging the passive restraint 12 to service the battery 1 stored in the component retention system 15. In this embodiment the main body strap 5 is constructed of a material that may be deformed from a first generally straight form to a second bent form so that the strap 16 can be lifted upward so the flange 13 may clear the passive restraint 12. In this embodiment the passive restraint 12 is fixedly attached to the vehicle floor 17 and does not move. As an alternative, as shown in FIG. 9B, the strap 16 is constructed of a material that may be deformed from a first generally straight form to a second bent form so that the flange may clear the passive restraint 12.

The battery 1 is installed below the seat 3 by fixing the battery 1 within the retention system 15. The strap 16 is then positioned so that the flange 13 is disposed behind the passive restraint 12. This is performed by bending the main body strap 5 upward and/or bending the strap 16 depending on which embodiment is utilized (FIG. 9A, 9B). the captured fastener 6 is then inserted in the threaded hole provided in the floor 17.

Figure 9B:
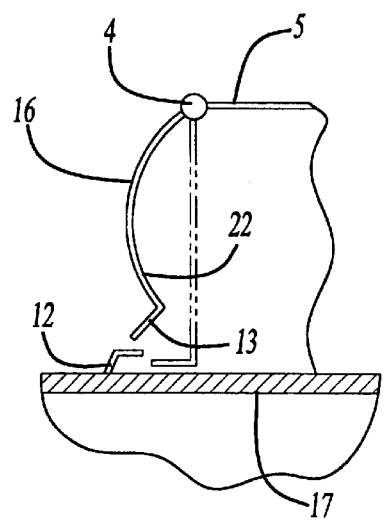
FIG. 9B shows the component storage unit strap being deformed so as to gain access to the storage area without engaging the passive restraint.

During removal, the fastener 6 is released and the flange 13 is lifted upward as shown in either FIGS. 9A or 9B or alternatively, the passive restraint 12 is rotated downward and rearward (as illustrated in FIG. 8) so that the strap 16 can be lifted out of the way. The battery 1 can then be removed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A passive restraint system for vehicular components comprising:

a storage compartment being substantially defined by the supports of a vehicle seat and the floor of the vehicle and having an opening on one side thereof, a closure member hingedly attached to said one side of said storage compartment which can move from a first generally horizontal open position to a second generally vertical closed position, and a passive restraint engaging said closure member when said closure member is moved from said closed position toward said open position.

2. The passive restraint and interlock system as in claim 1, wherein said closure member has a main body and a flange extending generally perpendicular to an end portion of said main body.

3. The passive restraint and interlock system as in claim 2 further comprising a captured fastener engaging said flange.

4. The passive restraint and interlock system as in claim 2 wherein said passive restraint is a tab that engages said flange of said closure member.

5. The passive restraint and interlock system as in claim 2, wherein said closure member is constructed of a deformable material.

6. A passive restraint and interlock system for vehicular components comprising:

a storage compartment having an opening on one side thereof, a closure member having a main body and a flange extending generally perpendicular to an end portion of said main body hingedly attached to said one side of said storage compartment which can move from a first generally horizontal open position to a second generally vertical closed position, and a passive restraint including a tab that engages said flange of said closure member when said closure member is moved from said closed position toward said open position, wherein the passive restraint tab can be moved from a first generally vertical latched position to a second generally horizontal unlatched position.

7. A motor vehicle fitted with a passive restraint and interlock system for interior mounted vehicular components comprising:

a vehicle body, at least one seat mounted in said vehicle body, a storage compartment being substantially defined by the supports of said at least one seat and a floor of the vehicle and having an opening on one side thereof, a closure member hingedly attached to said one side of said storage compartment which can move from a first generally horizontal open position to a second generally vertical closed position, and a passive restraint engaging said closure member when said closure member is moved from said closed position toward said open position.

8. The motor vehicle according to claim 7, wherein said closure member has a main body and a flange extending generally perpendicular to an end of said main body.

9. The motor vehicle according to claim 8, further comprising a captured fastener engaging said flange.

10. The motor vehicle according to claim 9, wherein the passive restraint is a tab that engages said flange of said closure member.

11. The motor vehicle according to claim 10, wherein said closure member is constructed of a deformable material.

12. The motor vehicle according to claim 7, wherein said storage compartment includes a main body strap which hingedly supports said closure member.

13. The motor vehicle according to claim 12, wherein said main body strap is made from a deformable material.

14. A motor vehicle fitted with a passive restraint and interlock system for interior mounted vehicular components comprising:

a vehicle body, at least one seat mounted in said vehicle body, defining a storage compartment having a an opening on one side thereof, a closure member having a main body and a flange extending generally perpendicular to an end portion of said main body hingedly attached to said one side of said storage compartment which can move from a first generally horizontal open position to a second generally vertical closed position, and a passive restraint including a tab that engages said flange of said closure member when said closure member is moved from said closed position toward said open position, wherein the passive restraint tab can be moved from a first generally vertical latched position to a second generally horizontal unlatched position.

\* \* \* \* \*